(12) United States Patent
Buell et al.

(10) Patent No.: US 6,484,837 B1
(45) Date of Patent: Nov. 26, 2002

(54) MOTORCYCLE FRAME HAVING INTEGRAL FUEL STORAGE UNIT AND BREAK-AWAY STEERING HEAD

(75) Inventors: Erik F. Buell, Mukwonago; Todd R. Wightman, Waukesha; Dane J. Hoechst, Elkhorn; Vance C. Strader, New Berlin; Donald S. Ferguson, Pell Lake; Abraham Askenazi, Burlington, all of WI (US)

(73) Assignee: Buell Motorcycle Company, East Troy, WI (US)

( * ) Notice: Subject to any disclaimer, the term of this patent is extended or adjusted under 35 U.S.C. 154(b) by 0 days.

(21) Appl. No.: 09/901,485

(22) Filed: Jul. 9, 2001

(51) Int. Cl.[7] ............................................. B62K 11/02
(52) U.S. Cl. ...................................... 180/225; 280/279
(58) Field of Search ................................. 180/219, 225; 280/279, 280, 830, 832, 834, 835

(56) References Cited

U.S. PATENT DOCUMENTS 4,461,489 A * 7/1984 Tsukiji et al. ............... 180/225
4,951,774 A   8/1990 Buell
6,186,550 B1 * 2/2001 Horii et al. .................. 180/225

* cited by examiner

Primary Examiner—Kevin Hurley
(74) Attorney, Agent, or Firm—Michael Best & Friedrich LLP

(57) ABSTRACT

The present invention includes a motorcycle frame that has a steering head and a fuel storage unit that is adapted to contain motorcycle fuel. A separating wall is disposed between the fuel storage unit and the steering head to substantially prevent fluid communication between the fuel storage unit and the steering head. The steering head includes a stress focusing structure for separating the steering head from the fuel storage unit and leaving the separating wall substantially intact to contain fuel within the fuel storage unit in response to a predetermined force being applied to at least one of the steering assembly and the front wheel.

18 Claims, 3 Drawing Sheets

MOTORCYCLE FRAME HAVING INTEGRAL FUEL STORAGE UNIT AND BREAK-AWAY STEERING HEAD

BACKGROUND

The invention relates to a motorcycle frame structure and more specifically, to frame structures having integral fuel tanks.

Most motorcycles include a frame assembly to which an engine, transmission, and fuel tank are mounted. U.S. Pat. No. 4,951,774 discloses a frame assembly in which fuel is stored within the frame structure to save room. With such a design, a separate fuel tank is not required.

SUMMARY

The present invention is an improvement over the combination frame and fuel tank disclosed in U.S. Pat. No. 4,951,774. The present invention provides a motorcycle including a frame having a steering head, a rear wheel interconnected with the frame for rotation with respect to the frame, a steering assembly pivotably mounted to the steering head; and a front wheel rotatably mounted to the steering assembly.

The frame also includes a fuel storage unit that is adapted to contain motorcycle fuel. A separating wall is disposed between the fuel storage unit and the steering head to prevent fluid communication between the fuel storage unit and the steering head. The steering head includes a stress focusing structure for separating the steering head from the fuel storage unit and leaving the separating wall substantially intact to contain fuel within the fuel storage unit in response to a predetermined force being applied to at least one of the steering assembly and the front wheel.

Other features and advantages of the invention will become apparent to those skilled in the art upon review of the following detailed description, claims, and drawings.

Figure 1:
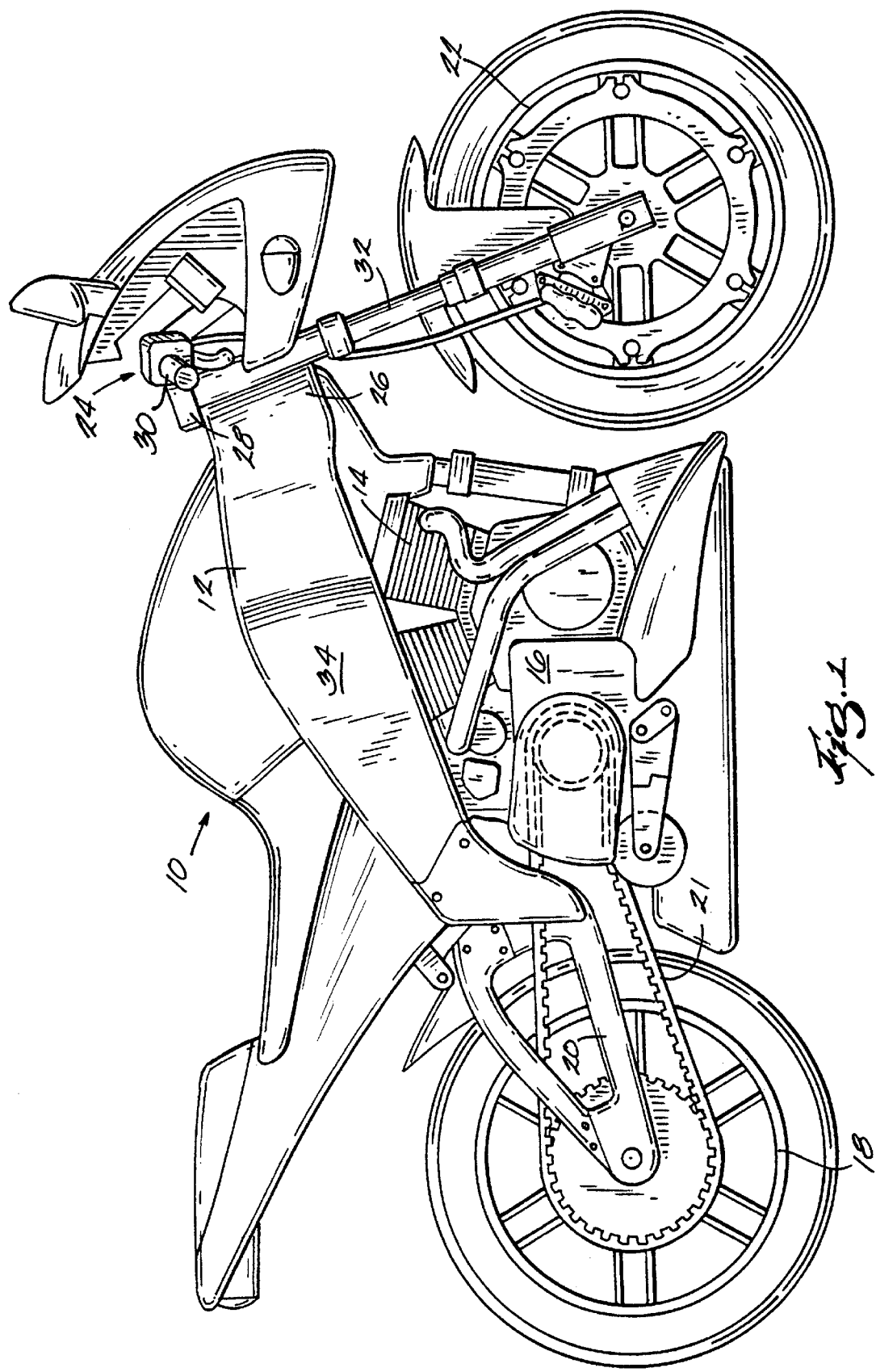
FIG. 1 is a side view of a motorcycle embodying the invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

FIG. 1 illustrates a motorcycle 10 that includes a frame 12 and an engine 14 and transmission 16 supported by the frame 12. The frame 12 is supported by a rear wheel 18 that is interconnected to the frame 12 by way of a swingarm 20. The swingarm 20 is pivotally connected at one end to the transmission 16, or, alternatively, to the frame 12 and/or transmission 16. The rear wheel 18 is driven by the engine 14 through the transmission 16 and a flexible drive member such as a chain or the illustrated drive belt 21. A front wheel 22 supports the front of the motorcycle 10. A steering assembly 24 is interconnected between the front wheel 22 and a steering head 26 of the frame 12. The steering assembly 24 includes a triple tree 28, handlebars 30, a steering column 31 (FIG. 4), and a pair of fork members 32 straddling the front wheel 22.

Figure 2:
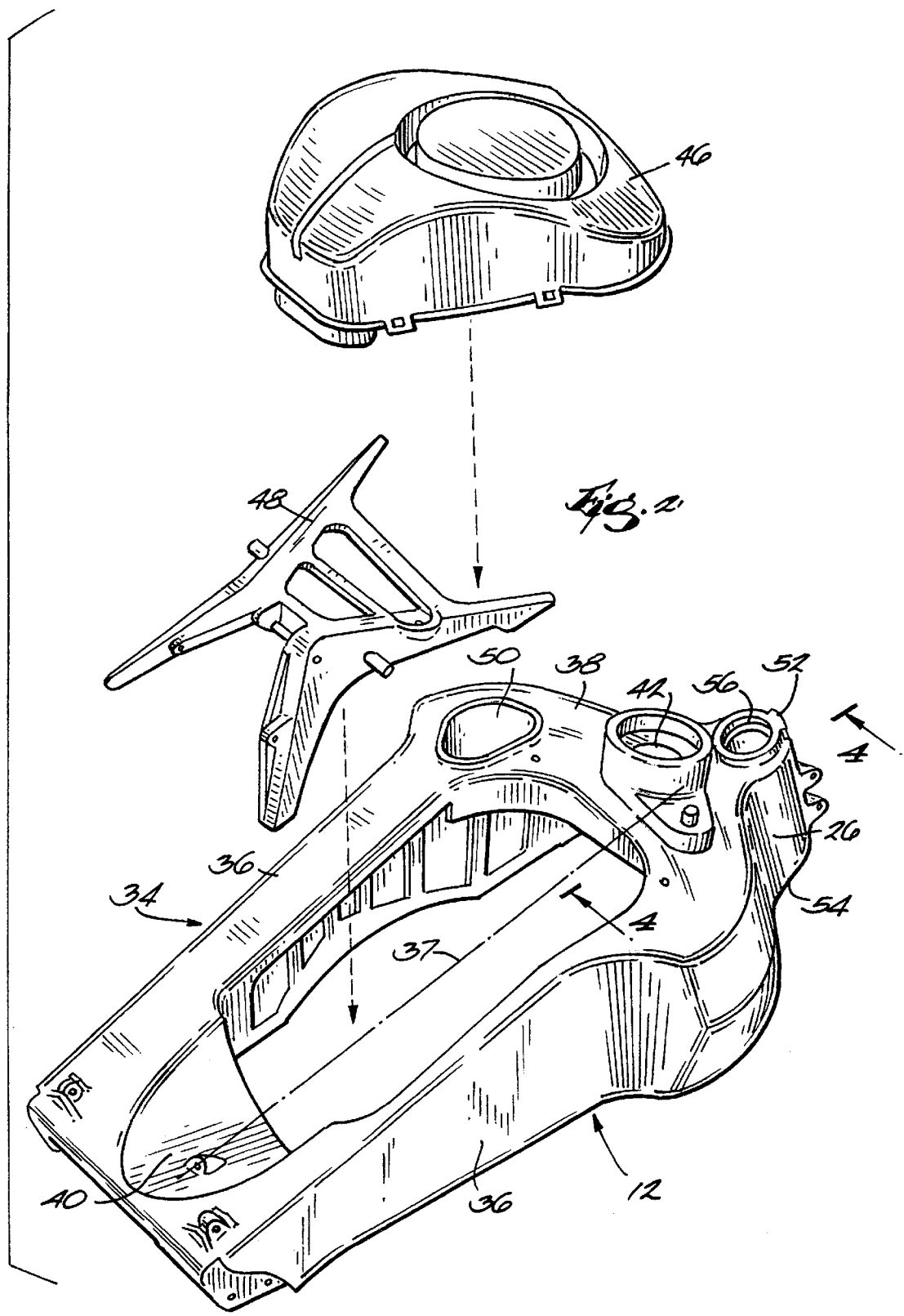
FIG. 2 is an exploded view of the frame and an air box assembly of the motorcycle in FIG. 1.
Figure 3:
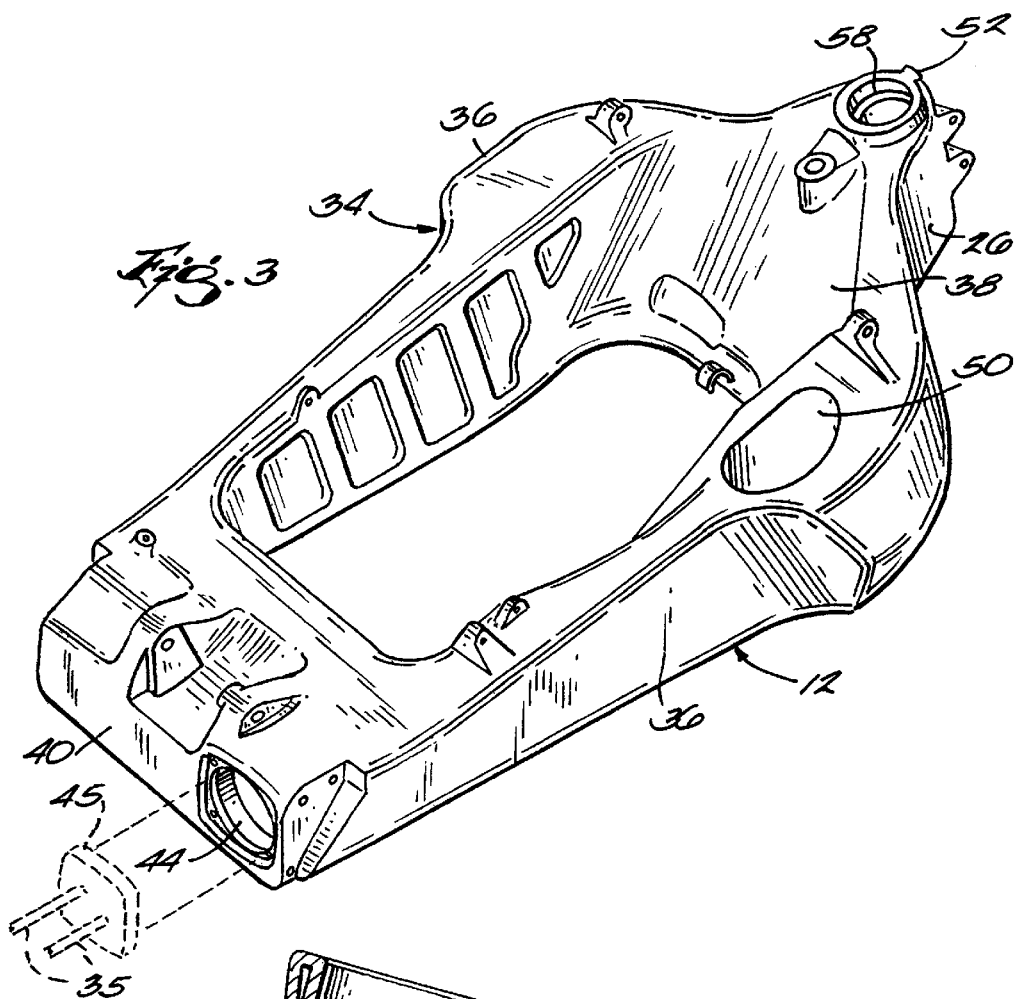
FIG. 3 is a bottom perspective view of the frame.

Turning to FIGS. 2 and 3, the frame 12 includes a fuel storage unit 34 that is used to contain motorcycle fuel and communicate with the engine 14 through fuel lines 35 (FIG. 3) for the delivery of fuel to the engine 14. The fuel storage unit 34 is preferably an integral portion of the frame 12. The fuel storage unit 34 includes a pair of hollow beams 36 that extend rearwardly from the front of the motorcycle 10. The hollow beams 36 are positioned on opposite sides of and space equally from a frame longitudinal axis 37.

The hollow beams 36 are connected together at their front ends by a forward portion 38 and at their rear ends by a rearward portion 40. The forward and rearward portions 38, 40 are hollow and communicate between the hollow beams 36. Preferably, the forward and rearward portions 38, 40 and the hollow beams 36 form a continuous hollow cavity 41 (FIG. 4) that forms an enclosed loop. The forward portion 38 includes a filler opening 42 that communicates with the cavity 41. The rearward portion 40 includes an aperture 44 (FIG. 3) that is adapted to receive a fitting 45 which is connected to the fuel lines 35.

The motorcycle 10 includes an air box 46 (FIG. 2) that is in fluid flow communication with the engine 14 to provide combustion air thereto. The air box 46 is mounted to the frame 12 on an air box support 48. The illustrated air box 46 may be larger than typical air boxes due to the space made available by incorporating the fuel storage unit 34 into the frame 12. An air passage 50 extends generally perpendicular to the frame longitudinal axis 37 through the front portion of the frame 12 to provide combustion air to air box 46.

The steering head 26 is a generally hollow cylindrical structure that includes a top end 52 and a bottom end 54. The top end 52 includes a top counter bore 56 and the bottom end 54 includes a bottom counter bore 58 that is substantially aligned with the top counter bore 56. The counter bores 56, 58 support the steering column 31 for pivotal movement. The steering head 26 is separated from the fuel storage unit 34 by a separating wall 60. The separating wall 60 defines the front end of the fuel storage unit 34 to substantially prevent flow of fuel from the fuel storage unit 34 into the steering head 26. The steering head and separating wall 60 are preferably made of cast aluminum and are preferably formed integrally with each other in a permanent mold casting process.

Figure 4:
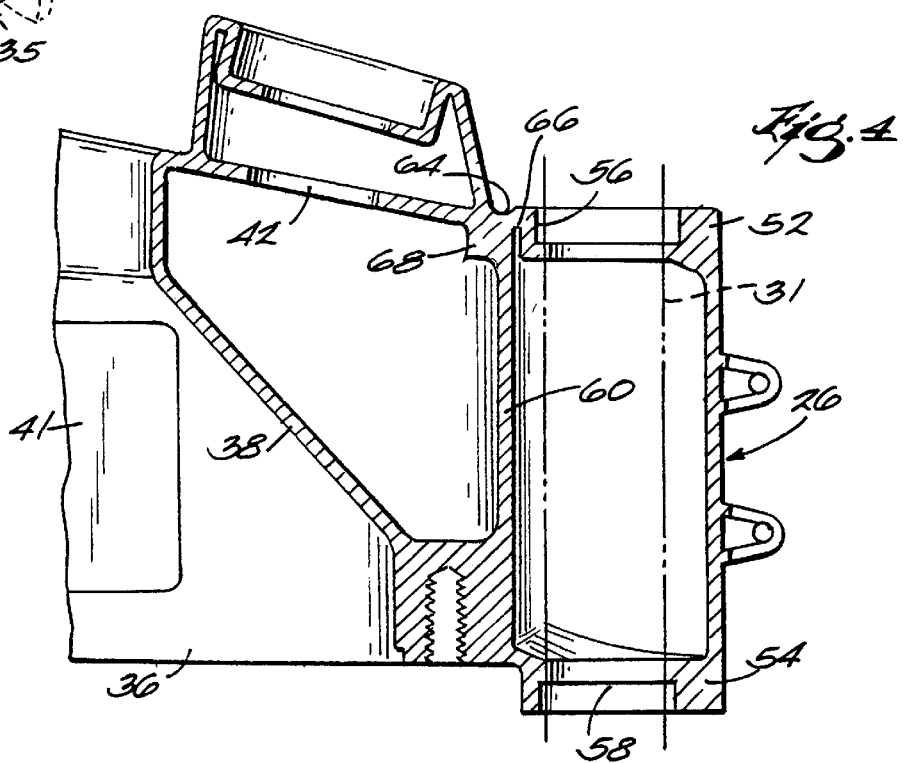
FIG. 4 is cross-section view taken along line 4—4 in FIG. 2.

Referring to FIG. 4, the top 52 of the steering head 26 is connected to the separating wall 60 by a stress focusing structure, which includes a notch 64 and a squared junction 66 in the illustrated embodiment. In addition, the stress focusing structure includes a strengthening rib 68 at the connection between the fuel storage unit 34 and the separating wall 60. It should be noted that the stress focusing structure could include any configuration that significantly weakens the connection between the steering head 26 and separating wall 60 and/or any configuration that significantly strengthens the connection between the fuel storage unit 34 and the separating wall 60.

The stress focusing structure is sufficiently strong structurally to avoid breaking during normal operation of the motorcycle 10. The stress focusing structure creates a tri-axial state of stress upon the application of a predetermined amount of force from the front (e.g., a frontal collision) on the steering assembly 24 or the front wheel 22. For example, in a frontal collision when the steering assembly 24 is forced to pivot about the bottom end 54 of the steering head 26, the top end 52 of the steering head 26 pulls away from the separating wall 60. The stress focusing structure allows the fracture to originate at and propagate along the steering head 26 away from the separating wall 60. In contrast, if the weakest point was not located within the steering column but was located on the other side of the separating wall 60, the collision would potentially expose fuel to the environment.

The stress focusing structure therefore causes the steering head 26 to be separated from the fuel storage unit 34 while leaving the separating wall 60 substantially intact. The steering head 26 may thus be termed a "break-away" steering head 26. The likelihood of a fuel spill in the event of a front collision is reduced by the illustrated structure because the separating wall 60 remains substantially intact.

What is claimed is:

1. A motorcycle comprising:
   a frame including at least one hollow beam adapted to contain motorcycle fuel, a steering head, and a separating wall disposed between said hollow beam and said steering head to prevent communication between said hollow beam and said steering head;
   a rear wheel interconnected with said frame to support a rear portion thereof;
   a steering assembly pivotably mounted to said steering head; and
   a front wheel rotatably mounted to said steering assembly;
   wherein said steering head includes a stress focusing structure for separating said steering head from said hollow beam and leaving said separating wall substantially intact to contain fuel within said hollow beam in response to a predetermined force being applied to at least one of said steering assembly and front wheel.

2. The motorcycle of claim 1, wherein said stress focusing structure includes a notch formed in a wall of said steering head.

3. The motorcycle of claim 1, wherein said stress focusing structure includes a squared junction between said separating wall and said steering head.

4. The motorcycle of claim 1, wherein said stress focusing structure includes a strengthening rib at the connection between said separating wall and said hollow beam.

5. The motorcycle of claim 1, wherein said stress focusing structure is interposed between a portion of said steering head and said separating wall.

6. The motorcycle of claim 1, wherein said steering head and separating wall are integrally formed with each other.

7. The motorcycle of claim 1, wherein said at least one hollow beam includes first and second hollow beams spaced apart from each other.

8. The motorcycle of claim 7, further comprising at least one joining portion communicating between said first and second hollow beams.

9. The motorcycle of claim 8, wherein said at least one joining portion includes first and second joining portions, said first joining portion communicating between first ends of said first and second hollow beams and said second joining portion communicating between second ends of said first and second hollow beams, said beams and joining members defining a generally ring-shaped fuel storage cavity within said frame.

10. A motorcycle frame comprising:
    at least one hollow beam adapted to contain motorcycle fuel;
    a steering head;
    a separating wall disposed between said hollow beam and said steering head to prevent communication between said hollow beam and said steering head; and
    a stress focusing structure for separating said steering head from said hollow beam and leaving said separating wall substantially intact to contain fuel within said hollow beam in response to a predetermined force being applied to said steering head.

11. The frame of claim 10, wherein said stress focusing structure includes a notch formed in a wall of said steering head.

12. The frame of claim 10, wherein said stress focusing structure includes a squared junction between said separating wall and said steering head.

13. The frame of claim 10, wherein said stress focusing structure includes a strengthening rib at the connection between said separating wall and said hollow beam.

14. The frame of claim 10, wherein said stress focusing structure is interposed between a portion of said steering head and said separating wall.

15. The frame of claim 10, wherein said steering head hollow beam, and separating wall are integrally formed with each other.

16. The frame of claim 10, wherein said at least one hollow beam includes first and second hollow beams spaced apart from each other.

17. The frame of claim 16, further comprising at least one joining portion communicating between said first and second hollow beams.

18. The frame of claim 17, wherein said at least one joining portion includes first and second joining portions, said first joining portion communicating between first ends of said first and second hollow beams and said second joining portion communicating between second ends of said first and second hollow beams, said beams and joining members defining a generally ring-shaped fuel storage cavity within said frame.

* * * * *